United States Patent [19]

Mentink et al.

[11] Patent Number: 5,304,547
[45] Date of Patent: Apr. 19, 1994

[54] PROCESS OF REFINING MIXTURES OBTAINED FROM TREATMENTS OF FATTY MEDIA WITH CYCLODEXTRIN AND CONTAINING COMPLEXES OF CYCLODEXTRIN MAINLY WITH LIPOPHILIC SUBSTANCES OTHER THAN FATTY ACIDS

[75] Inventors: Léon Mentink, Estaires; Michel Serpelloni, Beuvry Les Bethune, both of France

[73] Assignee: Roquette Freres, France

[21] Appl. No.: 647,059

[22] Filed: Jan. 29, 1991

[30] Foreign Application Priority Data

Jan. 29, 1990 [FR] France ................................ 90 01007

[51] Int. Cl.$^5$ .................... A01N 43/04; A61K 31/715; C09F 5/10
[52] U.S. Cl. .................... 552/545; 536/102; 536/119; 426/572; 424/439; 435/55; 260/420; 554/212
[58] Field of Search ................ 514/58; 536/119, 102; 426/572; 424/439; 260/420; 435/55

[56] References Cited

U.S. PATENT DOCUMENTS

| | | | |
|---|---|---|---|
| 3,491,132 | 1/1970 | Reiners et al. | 260/420 |
| 4,292,263 | 8/1981 | Barnes et al. | 426/572 |
| 4,383,992 | 5/1983 | Lipari | 514/58 |
| 4,528,271 | 7/1985 | Pechány et al. | 435/59 |
| 4,870,060 | 9/1989 | Müller | 514/58 |
| 4,880,573 | 11/1989 | Courregelongue et al. | 260/420 |
| 4,971,797 | 11/1990 | Cherukuri et al. | 424/439 |

FOREIGN PATENT DOCUMENTS 0326469  1/1989  European Pat. Off. .

OTHER PUBLICATIONS

Die Starke, vol. 27, No. 11, Nov. 1975, pp. 368–376; J. Szejtli et al.: "Inclusion complexes of unsaturated fatty acids with amylose and cyclodextrin".

Journal of Food Science, vol. 51, No. 4, 1986, pp. 1024–1027; L. Szente et al: "Molecular encapsulation of natural and synthetic coffee flavor with $\beta$-cyclodextrin".

Primary Examiner—Michael G. Wityshyn
Assistant Examiner—Louise N. Leary
Attorney, Agent, or Firm—Larson and Taylor

[57] ABSTRACT

Process of refining mixtures obtained from treatments of fatty media with cyclodextrin and containing complexes of cyclodextrin substantially with lipophilic substances other than fatty acids, characterized in that the said mixture is successively subjected to a heat treatment in the presence of a solvent system containing water, the mixture thus treated is separated into different raffinates and the raffinates are recovered.

8 Claims, No Drawings

PROCESS OF REFINING MIXTURES OBTAINED FROM TREATMENTS OF FATTY MEDIA WITH CYCLODEXTRIN AND CONTAINING COMPLEXES OF CYCLODEXTRIN MAINLY WITH LIPOPHILIC SUBSTANCES OTHER THAN FATTY ACIDS

The invention has as its object a process of refining mixtures obtained from treatments of fatty media with cyclodextrin and containing complexes of cyclodextrin with lipophilic substances other than fatty acids.

The term "fatty media" denotes any substance containing fats, namely:
on the one hand, biological substances whose origin is
  animal, such as fats from the group comprising tallow, lard, concentrated butter, fish oils, wool grease, blood, cerebrospinal materials, egg, milk and their derivatives,
  vegetable, such as vegetable oils, rosins, deodorant condensates, media containing aromatic substances such as essential oils or oleo resins, and odoriferous substances,
  fossil, as for example mineral oils, and
on the other hand, synthetic substances such as artificial flavourings or perfumes.

Cyclodextrins are cyclic molecules of polyanhydroglucose having a truncated cone shaped tubular configuration. They are known respectively as alpha-, beta- or gamma-cyclodextrin according to whether they are composed of 6, 7 or 8 anhydroglucose units.

For the sake of simplicity, the general term "cyclodextrin" is used hereinafter to denote any one of the alpha-, beta- or gamma-cyclodextrins a mixture thereof or derivatives of cyclodextrin.

Cyclodextrin is prepared by the treatment of liquefied starch with an enzyme, the cyclodextrin glycosyl transferase (C. G. T.).

Due to its particular toroidal structure defining a hydrophobic cavity, cyclodextrin has the property of selectively absorbing in its hydrophobic cavity various reactive groups and molecular species basically belonging to lipophilic substances. The affinity of these lipophilic substances for cyclodextrin (association constant) depends on their nature and their chemical configuration as well as on their size in relation to that of the cavity of cyclodextrin, which in turn depends on the number of glucose residues.

This natural capacity of cyclodextrin for complex formation is beginning to be utilized commercially, in particular in parts of the food industry, the pharmaceutical and cosmetics industry and in industry in general.

It has thus been proposed to use cyclodextrin in processes for the removal and separation of undesirable compounds as well as for the recovery of valuable compounds from biological fatty media.

Among these processes may be mentioned the extraction of steroids, in particular cholesterol, from fats or biological substances such as those described in French Patent Applications Nos. 2,601,959 and 2,626,145.

Processes for the selective extraction of aromatic substances present in essential oils or for the removal of degradation compounds which impair the aromatic power of these essential oils are also known (L. Szente "Cyclodextrin Workshop", Gand, 1989, Part 2, pages 5–6).

Thus U.S. Pat. No.3,491,132 describes a process for reducing the free fatty acid content of glyceride oils by, means of $\beta$-cyclodextrin.

In these processes, cyclodextrin is brought into contact, in the presence of water, with the biological fatty medium containing the lipophilic compounds to be extracted, cyclodextrin being incorporated in sufficient quantity to form complexes with the latter. Once formed, the complexes are in the aqueous phase which is separated from the fatty phase.

On an industrial scale, these aqueous residues which contain the compounds to be removed or purified are extraction products which are produced in very large quantities. By way of example, reference may be made to the process of extraction of cholesterol from fats described in French Patent Application No.2,601,959, which process leads to the formation of about 10% by weight of extraction product, based on the quantity of fat treated at the head of the process.

The Applicant Company has been preoccupied with the problem of utilization of these residual mixtures obtained from the processes of extraction.

It would be of particular interest for industries employing the said processes or using these lipophilic compounds as starting materials to be able to fractionate these residual mixtures so as to recover each of their advantageous components in a substantially pure form. This applies particularly to cyclodextrin, which could then be reused in extraction processes so as to reduce their cost but also to certain lipophilic substances present in the mixtures, which may or may not be included in the internal cavity of the cyclodextrin. These substances may be lipid substances which could be recycled, steroids, vitamins, aromatic substances and other compounds capable of being re-utilized.

It is therefore an object to solve the difficult problem of fractionating, separating and recovering in a pure form the various components of a mixture present as a complex heterogeneous medium, the difficulty being increased by the extremely great affinity of certain lipophilic substances for cyclodextrin.

The process described in French Patent Application 2,513,656 does not enable this problem to be solved in a satisfactory manner. The Patent in question describes a method of dissociating complexes of cyclodextrin with lipophilic compounds other than fatty acids, in particular of the steroid type, carried out after the utilization of $\beta$-cyclodextrin in processes for the microbiological conversion of steroids. This $\beta$-cyclodextrin is intended to solubilize the steroids in water which is a medium particularly suitable for this type of reaction. $\beta$-Cyclodextrin may be recovered from the aqueous medium of bioconversion by extraction of the steroids with an organic solvent such as diisopropylether followed by precipitation of the free cyclodextrin by means of a solvent such as cyclohexane, trichloroethylene or toluene, which is capable of reducing its solubility by the formation of a complex. $\beta$-Cyclodextrin is then isolated in solid form by filtration. Before $\beta$-cyclodextrin can be reused, it must be subjected to a costly treatment of purification for removal of the solvent. If one wished to apply this method to foods, it would be necessary to remove all traces of solvents due to their being non-edible, and this would entail even greater expense. Further, the use of solvents necessitates the observance of strict safety rules which would require important and expensive investments. The technique of recovery employed is complex and does not meet the requirements of industry for economic efficiency. Further, it does not enable a large variety of lipophilic compounds to be dissociated from their complexes and extracted.

Lastly, this process of recovery is entirely specific to treatments of bioconversion of steroids and could not be used generally for other applications.

For the record one could also cite U.S. Pat. No. 3,491,132 mentioned above although it does not relate to the present invention, since it applies to fatty acids, which constitute a different group of lipophilic compounds. This Patent proposes a process of decomplexation consisting of diluting with water the aqueous phase containing the complexes with water and heating the mixture to boiling. The link between β-cyclodextrin and the fatty acids breaks down and the fatty acids can be recovered from the supernatant layer.

β-Cyclodextrin remains in the aqueous phase and may be recovered in the solid form after cooling.

Only a small proportion of the fatty acids present in the initial mixture containing the complexes can be recovered by such a process.

The β-cyclodextrin is therefore only imperfectly purified and will be difficult to recycle since it is liable to pollute the fats into which it is introduced.

Further, the yields of purification obtained by carrying out this process of decomplexation are so low that they are of no industrial interest.

Lastly and above all, the complexes treated are complexes of cyclodextrin/fatty acids which have particular physico-chemical characteristics different from those of complexes of cyclodextrin with other lipophilic compounds. The process of decomplexation disclosed in this Patent is therefore entirely specific to fatty acids and can in no case be applied to other lipophilic compounds.

It is to the merit of the Applicant Company to have found that the various components of a mixture obtained after the treatment of a fatty medium by means of cyclodextrin can be separated and purified in high yields by treating the said mixture with heat in the presence of water.

The process of refining according to the present invention is therefore characterised by the fact that a mixture obtained from the treatment of fatty media with cyclodextrin and containing complexes of cyclodextrin substantially with lipophilic substances other than fatty acids is subjected to a heat treatment in the presence of a solvent system containing water, the mixture thus treated being separated into different raffinates which are recovered. The term "raffinate" denotes the various fractions of components of the mixture obtained after refining.

The above-mentioned heat treatment in an aqueous medium has the effect on the one hand of bringing about at least partial dissociation of the "cyclodextrin/included compounds" complexes and on the other hand of releasing the non-included lipophilic compounds from their link with cyclodextrin.

When all these substances are free, they can easily be separated from cyclodextrin which may then be recovered and reused.

The process according to the invention enables the major proportion of the cyclodextrin initially present in the mixture to be obtained in the pure form. This cyclodextrin can be directly reused upstream in the treatment of biological media by means of cyclodextrin, which treatment then becomes more economical.

This process also enables all the lipophilic starting materials, including steroids if applicable, to be recovered, either in a fractionated form or not.

These fatty substances may be utilized as starting materials for the manufacture of food products, cosmetics, pharmaceutical products and others. They may also be subjected to treatments of purification such as saponification for the recovery of non-saponifiable products, of which steroids constitute highly valuable components.

The respective proportions of dry starting mixture to be treated and solvent system vary from 0.02:1 to 4:1 parts by weight, preferably from 0.10:1 to 1:1 parts by weight.

Stirring is advantageously carried out at least prior to the heat treatment but also throughout the duration of the heat treatment so as to homogenize the mixture with the solvent system.

Piston homogenizers of the ALMO type or spiral homogenizers of the ULTRATURAX type or any other suitable system known per se may be used to modify the physical characteristics of the mixture so as to optimize its refinement.

According to the invention, the heat treatment is carried out at a temperature from 30° to 200° C.

The duration of this treatment is from several seconds to several minutes, preferably from 1 to 10 minutes and even more preferably about 5 minutes.

If the included substances consist substantially of steroids or compounds of aromas, the temperature for the heat treatment is from 100° to 150° C, preferably from 110° to 140° C, more preferably in the region of 120° C.

According to one variation of carrying out the invention, the heat treatment comprises at least two stages.

In a first stage, the mixture is subjected to a heat treatment at a temperature $T_1$ of from 30° to 100° C. in the presence of the solvent system and the lipophilic compounds which have the weakest link with cyclodextrin and have been liberated are then separated from the starting mixture.

The second stage consists of subjecting the residual mixture to a second heat treatment at a temperature $T_2$ of from 100° to 200° C. in the solvent system and then separating the remaining, thus liberated lipophilic compounds from the residual mixture.

This variation is advantageous as it enables the various lipophilic phases to be recovered and utilized separately.

Those lipophilic compounds which have the weakest link with cyclodextrin and have a composition close to that of the starting medium to which the processes of extraction with cyclodextrin were applied may thus be reincorporated in the said starting medium.

To the extent that the included substances obtained from the treatment with cyclodextrin consists substantially of steroids or compounds of aromas, the second stage is preferably carried out at a temperature $T_2$ of from 100° to 150° C., preferably from 100° to 140° C. and more preferably in the region of 120° C.

In one advantageous embodiment of the process according to the invention, the heat treatment is carried out in the presence of a solvent system consisting entirely of water.

In another advantageous embodiment of the process according to the invention, all or part of the heat treatment is carried out in the presence of at least one product capable of improving the capacity of the solvent system for complex breakdown and/or of facilitating the separation of the raffinates.

This product is advantageously selected from sugars, polyols and alcohols.

A polyol such as glycerol, xylitol or sorbitol is preferably used, glycerol being preferred.

It has been found that glycerol enables the extraction of lipophilic compounds and their separation from the aqueous phase to be considerably improved.

The water/glycerol ratio is preferably from 3:1 to 1:2 parts by weight, more preferably in the region of 1:1 parts by weight.

The pH of the medium may be adjusted to optimize the decomplexation and increase the yields of recovery of raffinates.

After the separation subsequent to the heat treament has been carried out, for example by decantation or centrifugation, the process according to the invention results in the formation, in the heat of at least two phases. The first, fatty phase which has a lower density than the solvent system constitutes the supernatant phase. The second is formed by the solvent system (water alone or water/product) and contains the cyclodextrin.

A third phase may be observed, consisting of the untreated residue of the initial mixture.

It should be noted that if the fatty phase has not been homogenized, it may itself consist of several phases due to the various types of fatty substances of which it is composed.

To recover the cyclodextrin in a solid form, the solvent phase in which it is contained is advantageously removed and cooled to a sufficiently low temperature, for example in the region of 4° C.

The mother liquors remaining as residues may be recycled, in particular to the head of the process according to the invention.

Evaporation of the solvent system may also be carried out to recover the cyclodextrin in a higher yield.

If the solvent system consists entirely of water, the cyclodextrin in solution may be directly used as such. The untreated residue may be recycled.

If the included substances consist mainly of steroids and the solvent system consists of water alone, the said substances may be obtained in a second fatty phase after the temperature has returned to room temperature.

The use of an alcoholic product such as ethanol on the one hand enables the heat treatment to be carried out at a lower temperature with the same extraction yield as that obtained with a solvent system consisting entirely of water and on the other hand enables the yield of recovery of cyclodextrine to be increased by reducing its solubility in the cold.

When a high concentration of alcohol is used, it is found that part of the lipophilic compounds is dissolved in the hydroalcoholic phase.

The process according to the invention may be carried out either by a static or by a dynamic mode of operation.

In both these modes of operation, apparatus capable of producing high pressures are used to enable the high temperatures required for the process to be obtained.

The static mode of operation consists of treating a predetermined volume of starting mixture in the presence of the solvent system by heating it to a temperature suitable for the nature of the majority of the lipophilic compounds by means of a heating device such as, for example, an autoclave or a steam heater and then separating the various raffinates obtained by decantation or by centrifugation.

An apparatus of the autoclave type appears to be particularly suitable for the static mode of operation.

The static mode of operation is particularly suitable when the quantities of mixture to be refined are small, the mixture to be refined and/or the solvent system employed contain particularly volatile substances such as, for example, aromatic compounds, alcohols or glycerol, the characteristics of the solvent system are used not only for extraction but also for fractionating the lipophilic substances into a part which is soluble in the solvent system and another, insoluble part.

In the dynamic mode of operation, the starting is circulated in a heating apparatus after having been homogenized with the solvent system. After this heat treatment, the mixture is transferred to means for the separation of the different phases.

These means may in particular consist of an apparatus such as a centrifugal decanter which is preferably continuously self cleaning.

According to one advantageous embodiment, an apparatus which heats by the injection of steam or a thermochemical converter commonly known as a "jet cooker" is employed for a dynamic operation. Such an apparatus is traditionally used for boiling starch in the paper/cardboard industry.

As example may be mentioned the apparatus marketed by the Applicant Company under the name of HI-CAT cooker.

The principle of this apparatus consists of injecting steam into a heating coil inside which circulates the fluid which is to be heat treated and which is generally a starch slurry.

The steam is injected in concurrence with the fluid. It determines the pressure inside the circuit. This pressure may be regulated by means of a counter-pressure valve arranged close to the outlet end of the said circuit.

The duration of the heat treatment depends on the volume of the heating coil and on the rate of flow of the fluid.

The heated fluid is recovered at the outlet end of the heating coil after release of pressure in a cyclone and evacuation of the steam.

For its application to the process according to the invention, the jet cooker is equipped with at least one preparation vessel in which the starting mixture is homogenized with the solvent system. It advantageously also comprises, connected to the outlet end of the coil, separating means such as those mentioned above, namely a continuously operating self-cleaning centrifuge of the type marketed by the WESTFALIA Company.

Various raffinates may thus be collected at the outlet end of the centrifuge, namely: a fraction due to the lipophilic compounds, the solvent system containing cyclodextrin and the untreated residue which may be directly transferred to the preparation vessel for recycling.

According to another advantageous embodiment, the dynamic operation may be carried out by means of a heat exchanger, for example a plate type heat exchanger such as that marketed by the ALFA LAVAL Company under the Trade Mark ALFA-FLEX, consisting of a nest of tubes or a roughened surface.

In a manner comparable to the use of the jet cooker, at least one vessel for the preparation of the homogenized mixture composed of the starting mixture and the solvent system is arranged at the entrance to the heat exchanger. The outlet end of the exchanger is connected to continuous separating means similar to those described above.

According to one variation of the dynamic mode of operation, the heat treatment is a steam distillation consisting of circulating steam through the mixture to be refined, which has been homogenised with the solvent system, so as to extract the lipophilic compounds from the said mixture. To optimize this treatment, in particular in the case of volatile substances such as compounds of aromas, the extraction is preferably carried out under vacuum and the mixture homogenized with solvent is preferably circulated in counter-current to the steam.

This type of steam distillation and the apparatus suitable for carrying it out are known per se and are widely used for the deodorization of animal or vegetable fats.

According to the invention, it may be advantageous to combine one or more variations of this dynamic mode of operation.

The means described above for carrying out the invention are not limiting but relate to advantageous embodiments. Any other apparatus suitable for statically or dynamically heating the starting mixture over a wide range of temperatures in the presence of a solvent system containing water may be used for carrying out the process according to the invention.

The latter may be well understood and its advantages will be clearly apparent from the examples of embodiment which follow.

EXAMPLE 1

1. Preparation of a Decantate to be Treated by the Process According to the Invention The process of extraction of cholesterol described in Example 1 of French Patent Application No.2,601,959 is applied to the treatment of 100 kg of concentrated butter. 5 kg of $\beta$-cyclodextrin (marketed by the Applicant Company) are employed for this purpose in solution in 100 kg of tepid water.

After the components have been mixed at 40° C. and stirred at this temperature for 5 hours in a non-oxidizing atmosphere, the fatty phase depleted of cholesterol separates from the aqueous phase. The latter slowly clarifies to give rise to a decantate having a dry substance content in the region of 65% and composed of 80% of $\beta$-cyclodextrin and about 20% of fats.

About half of the total fat contained in the decantate is in a form weakly linked to $\beta$-cyclodextrin.

2. Refinement of the Decantate According to the Invention

In the process according to the invention, 1.8 kg of decantate obtained as described above are dispersed in cold water to form a slurry which is then treated in a thermochemical cooker of the type marketed by the Applicant under the name of HI-CAT cooker with direct injection of steam. The temperatures in the coils are adjusted by the rates of flow of steam. The times required for the passage of the mixture through the cooker are of the order of 5 minutes.

At the outlet end of the cooker, the heat treated mixture is continuously separated into three phases by means of a plate-type centrifuge such as that marketed by the WESTFALIA Company.

The lightest phase consists of fats. The heavy phase in the form of a deposit corresponds to the untreated decantate. The third phase which is of intermediate density is an aqueous phase containing $\beta$-cyclodextrin in solution. This may be used directly for the treatment of a fresh quantity of butter or it may be slowly cooled to 4° C. to form crystals of $\beta$-cyclodextrin which can be separated by simple filtration.

The results obtained from the treatment of the decantate at different temperatures are entered in Table 1 below:

TABLE 1

| Quantities of water for dispersion used for treating 1.80 kg of dry decantate | Treatment temperature | Quantities of $\beta$-cyclodextrin (in kg) | | Quantities of fats collected (in kg) | Quantities of untreated decantate collected (in kg) |
|---|---|---|---|---|---|
| | | Collected at 40° C. | Soluble and not collected at 4° C. | | |
| 5.00 | 105° C. | 0.01 | 0.07 | 0.09 | 1.60 |
| 5.00 | 120° C. | 0.75 | 0.09 | 0.18 | 0.78 |
| 5.00 | 120° C. | 0.85 | 0.09 | 0.23 | 0.60 |
| 5.00 | 150° C. | 0.10 | 0.09 | 0.01 | 1.58 |
| 2.00 | 150° C. | 0.00 | 0.04 | 0.00 | 1.73 |

A treatment temperature in the region of 120° C. provides for good separation of the fats and the $\beta$-cyclodextrin present in the decantate.

Qualitative analysis by thin layer chromatography of the fats collected shows that the compositions of the latter vary with the treatment temperature.

For a temperature of 105° C., the fat collected is very rich in triglycerides and low in cholesterol. A treatment at 120° C. on the other hand, results in a fatty phase having substantially the same composition as the total fat of the starting decantate, namely about 24% of cholesterol.

EXAMPLE 2

The decantate described in Example 1 is used in this example in an amount of 1.8 kg of dry substance for 5 liters of water. The milky mixture obtained is heated to 95° C. by a passage through a plate-type heat exchanger. At the outlet end, the mixture is centrifuged to be separated into three phases: A fatty phase, an aqueous phase and a deposit.

The fatty phase collected represents 48% of the total fat initially contained in the decantate. Gas phase chromatographic analysis of the latter indicates that it contains only 1.5% of cholesterol. The remainder consists of triglycerides (94%), fatty acids (2%) and water (2%).

This fat does not have a high peroxide index and may be reincorporated in concentrated butter before the treatment for extraction of cholesterol as described in French Patent Application No.2,601,959. This solution enables the yield of butter to be increased.

The aqueous phase and the deposit are mixed by stirring. The slurry obtained is treated at 120° C. on the lines described in Example 1. Three phases are obtained by centrifuging: A fatty phase, an aqueous phase and a deposit.

This new fatty phase represents 40% of the initial fat present in the decantate. It contains 36% of cholesterol, the remainder consisting mainly of free fatty acids. The minor compounds identified are triglycerides, water and β-cyclodextrin. The richness in cholesterol renders this new fatty phase interesting as starting material for the production of pure cholesterol or derivatives of cholesterol such as Vitamin D.

The aqueous solution containing β-cyclodextrin in the soluble state may be used again for the treatment of concentrated butter. It may also be cooled for obtaining crystals of β-cyclodextrin.

The deposit obtained according to the invention by double heat treatment has a composition very close to that of the starting decantate.

Constituting not more than 15% of the initial dry weight, it may be reincorporated in a fresh quantity of decantate to be treated again by the process according to the invention.

EXAMPLE 3

The decantate described in Example is used in this example in an amount of 100 g of dry substance.

This quantity of material is introduced into 7 sterilizable "twist-off" glass containers.

The nature of the solvents used and the quantities of solvents are shown in Table II. The percentages of glycerol present in the solvent systems are expressed by weight.

In each case the decantate is mixed with the selected solvent system by slow mechanical stirring for 10 minutes.

The mixtures, which are in the form of white slurries, are autoclaved at 120° C. for 5 minutes, then cooled to 70° C. and centrifuged hot at 300 revs/minute.

The supernatant phases are separated. These are then dried by stoving at 40° C. for 72 hours.

The yields of extraction of fats are calculated for each test. These values are shown in Table II.

It is noted that the extraction of these fats is better when the solvent system contains glycerol. Further, the quantity of cholesterol present in these fats increases with the quantity of glycerol present in the solvent system.

TABLE II

| Solvent used | Quantities (in kg) of solvent used for the treatment of 100 g of dry decantate | Yield of extraction of fats* (in %) | Level of cholesterol in the fats collected (in %) |
|---|---|---|---|
| Water | 0.62 | 73 | 15 |
| Water | 0.72 | 22 | 7 |
| Water | 1.45 | 29 | 8 |
| Water-glycerol (70%-30%) | 0.72 | 70 | 13 |
| Water-glycerol (50%—50%) | 0.62 | 95 | 24 |
| Water-glycerol (50%—50%) | 0.72 | 81 | 16 |
| Water-glycerol | 1.45 | 76 | 15 |

TABLE II-continued

| Solvent used | Quantities (in kg) of solvent used for the treatment of 100 g of dry decantate | Yield of extraction of fats* (in %) | Level of cholesterol in the fats collected (in %) |
|---|---|---|---|
| (50%—50%) | | | |

*(fats collected based on total fats of the decantate)

EXAMPLE 4

1) Preparation of a Deposit to be Treated by the Process According to the Invention A condensate of deodorizaton of a sunflower oil is treated with β-cyclodextrin (marketed under the Trade Name KLEPTOSE by the Applicant Company) to extract the phytosterols contained therein. The composition of this co-product obtained from the refining of a sunflower oil is shown in Table III below.

A double extraction is carried out on this condensate as follows:

β-cyclodextrin KLEPTOSE and water at 20° C. are added to the condensate. The whole is homogenized for 5 minutes with an apparatus of the ULTRATURAX type to give rise to a viscous and homogeneous emulsion. The latter is then diluted with water before being centrifuged at 3000 revs/minute at room temperature. A first centrifuge deposit, a fatty phase and an intermediate aqueous phase are thus separated. The latter phase is discarded. The two other phases are preserved.

β-cyclodextrin KLEPTOSE and water at 20° C. are added to the supernatant fatty phase obtained as described above in order to carry out a second extraction. The identical procedure is carried out for obtaining a second centrifuge deposit and a fatty phase which has been subjected to a double extraction. The latter is dried in a stove at 40° C. for 48 hours.

The centrifuge deposits are combined and then dried in a stove at 40° C. for 8 hours.

The composition of the whole deposit is shown in Table III below. It weighs 297 g.

TABLE III

| | Composition of the deodorisation condensate used (%) | Composition of the supernatant fatty phase (%) | Composition of the total dried deposit (%) |
|---|---|---|---|
| Total fats | 86.0 | 94.0 | 6.5 |
| of which | | | |
| free fatty acid and triglycerides | 82.0 | 82.5 | 61.0 |
| phytoserols (β-sitosterol + stigmasterol | 13.4 | 12.8 | 39.0 |
| tocopherols (α + β) | 4.6 | 4.7 | traces |
| β-cyclodextrin | — | — | 88.0 |
| Others (water, glycerol, pigments) | 14.0 | 6.0 | 4.5 |

β-Cyclodextrin has enabled phytosterols to be extracted by selective inclusion. The fatty phase treated is enriched in tocopherols, free fatty acids and triglycerides.

2) Refinement of the Deposit According to the Invention

According to the process of the invention, 30 g of the total deposit obtained as described above are placed in a sterilisable "twist-off" glass container.

60 g of double distilled glycerol and 150 ml of water are added to the deposit and mixed therewith by mechanical stirring so that a homogeneous slurry is obtained.

The whole is autoclaved at 120° C. for 5 minutes and then cooled to a temperature of 70° C. before being centrifuged. Three fractions are thus collected: A supernatant phase of a fatty nature, an aqueous phase and a denser white residue.

The fatty fraction is dried in an oven at 40° C. for 48 hours. It weighs 1.45 g, amounting to 74% of the fat initially present in the deposit.

After analysis by thin layer chromatography and gas phase chromotography, it is found that the fat extracted contains 58% of phytosterols, which is a value very close to that obtained from the analysis of the fat contained in the total deposit before treatment.

EXAMPLE 5

Preparation of an Aromatic Powder to be Treated by the Process According to the Invention An essential oil of peppermint is treated with β-cyclodextrin (marketed under the Trade name KLEPTOSE by the Applicant Company) to produce an isolated aromatic substance rich in menthol.

For this purpose, β-cyclodextrin KLEPTOSE is mixed with distilled water. A viscous white paste is thus obtained to which essential oil is slowly added with mechanical stirring.

The whole is then homogenized at 13,500 revs/minute, using an apparatus of the UNIMIX type. A paste suspended in the oily medium is thus obtained.

This paste is separated from the excess oil by vacuum filtration, using a Buchner type apparatus. An aromatic white powder is finally obtained. This contains 12.6% of dry substance of aromatic isolated substance.

2 Refining of the Aromatic Powder

According to the process of the invention, 60 g of aromatic powder are placed in a sterilizable "twist-off" glass container and 150 g of water and 50 g of ethanol are added. The whole is stirred mechanically for 10 minutes before being autoclaved at 120° C. for 5 minutes. An aromatic oily phase, an aqueous phase containing cyclodextrin in solution and an untreated residue are separated by centrifuging at 80° C.

The aromatic oily phase constitutes 88% by weight of the isolated substance initially present in the aromatic powder.

The aqueous phase is cooled to room temperature so that the β-cyclodextrin can be recovered in the solid form.

We claim:

1. The method of removing cyclodextrin from complexes of cyclodextrin with steroids, vitamins or compounds of aromas, which comprises subjecting the said complexes to heat treatment in the presence of water, at a temperature between 100° and 150° C., the proportions of complexes treated to said water being between 0.02:1 and 4:1 parts by weight on dry matter for a time sufficient to dissociate cyclodextrin from said complexes and recovering said cyclodextrin.

2. The method of claim 1, wherein the respective proportions of complexes to be treated and water are comprised between 0.10:1 and 1:1 parts by weight on dry matter.

3. The method of claim 1, wherein the temperature of the heat treatment is comprised between 110° and 140° C.

4. The method of claim 1, wherein the heat treatment is carried out in the presence of one product selected from the group consisting of sugars, polyols and alcohols.

5. The method of claim 4, wherein the heat treatment is carried out in the presence of glycerol.

6. The method of claim 5 wherein the water/glycerol ratio is comprised between 3:1 and 1:2 parts by weight.

7. The method of claim 1, wherein the steroids are cholesterol or β-sitosterol.

8. The method of claim 1, wherein the heat treatment is performed in a thermochemical converter of a jet cooker.

* * * * *

UNITED STATES PATENT AND TRADEMARK OFFICE
CERTIFICATE OF CORRECTION

PATENT NO. : 5,304,547

DATED : April 19, 1994

INVENTOR(S) : MENTINK et al.

It is certified that error appears in the above-identified patent and that said Letters Patent is hereby corrected as shown below:

Column 8:
Third column of Table 1, delete "40° C" and insert --4° C--.

Column 9, line 30, insert --1-- between "Example" and "is used".

Signed and Sealed this

First Day of November, 1994

BRUCE LEHMAN

Attest:

Attesting Officer

Commissioner of Patents and Trademarks